United States Patent [19]

Ammon et al.

[11] Patent Number: 5,664,530
[45] Date of Patent: Sep. 9, 1997

[54] TAPPET FOR A VALVE DRIVE OF AN INTERNAL COMBUSTION ENGINE

[75] Inventors: Reinhard Ammon, Nuremberg; Wilfried Huber, Aurachtal, both of Germany

[73] Assignee: Ina Walzlager Schaeffler KG, Germany

[21] Appl. No.: 696,174

[22] Filed: Aug. 13, 1996

[30] Foreign Application Priority Data

Nov. 16, 1995 [DE] Germany ............... 195 42 697.5

[51] Int. Cl.⁶ ................... F01L 1/16; F01L 1/24
[52] U.S. Cl. .................. 123/90.51; 123/90.55; 74/569
[58] Field of Search ............... 123/90.48, 90.49, 123/90.51, 90.52, 90.55; 74/569

[56] References Cited

U.S. PATENT DOCUMENTS

| | | | |
|---|---|---|---|
| 5,239,953 | 8/1993 | Shida | 123/90.55 |
| 5,320,074 | 6/1994 | Schultz et al. | 123/90.55 |
| 5,379,730 | 1/1995 | Schaeffler | 123/90.55 |

FOREIGN PATENT DOCUMENTS

| | | |
|---|---|---|
| 9317325 | 2/1994 | Germany. |
| 4325610 | 2/1995 | Germany. |

OTHER PUBLICATIONS

Simpson, Frank R., Joining Thin–walled Parts by Rubber Forming. In: Machinery, Oct. 1, 1954, vol. 85, S. 709–714.
JP4–246211(A), In: Patents Abstracts of Japan, M–1353, Sep. 1992, vol. 17, No. 21.

*Primary Examiner*—Weilun Lo
*Attorney, Agent, or Firm*—Bierman, Muserlian and Lucas LLP

[57] ABSTRACT

A tappet (1) for a valve drive of an internal combustion engine, which tappet (1) is guided for axial displacement in a reception bore of a cylinder head by a skirt (3) and is closed by a bottom (4) at a cam-proximate end, the skirt (3) comprising a first bush-like section (6) and a second bush-like section (7) of approximately equal diameter separated from each other preferably in a region of a central transverse plane, the first section (6) being connected to the bottom (4), while the second section (7) proceeds longitudinally from the first section (6), characterized in that the hardened first bush-like section (6) is connected to the unhardened second bush-like section (7) by interlocking and a method and apparatus for its preparation.

8 Claims, 5 Drawing Sheets

TAPPET FOR A VALVE DRIVE OF AN INTERNAL COMBUSTION ENGINE

FIELD OF THE INVENTION

The invention concerns a tappet for a valve drive of an internal combustion engine, which tappet is guided for axial displacement in a reception bore of a cylinder head by a skirt and is closed by a bottom at a cam-proximate end, the skirt comprising a first and a second bush-like section of approximately equal diameter separated from each other, preferably in a region of a central transverse plane, the first section being connected to the bottom, while the second section proceeds longitudinally from the first section and a method and apparatus for manufacturing such a tappet.

BACKGROUND OF THE INVENTION

In a tappet of the aforesaid type known from German Utility Model G 93 17 325.3, the two bush-like sections of the skirt are joined to each other by welding, soldering or gluing, and the tappet is heat-treated as a whole to obtain higher hardness values. A drawback of this prior art is that the joining of the two skirt sections by the joining methods mentioned can result in an obstruction of the oil supply channel with the known negative consequences. A further drawback is that thin-walled regions of the tappet are hardened to the core during the heat treatment and this leads to their embrittlement and a tendency to crack. Methods used in the past to avoid these problems consisted in either shielding the thin-walled parts during the heat treatment or re-annealing them after the heat treatment. This procedure, however, involves more time and work and is therefore more expensive.

OBJECTS OF THE INVENTION

It is an object of the invention to create an improved tappet of the generic type in which the aforesaid drawbacks are eliminated and which, in particular, can be manufactured at lower costs.

It is another object of the invention to provide a novel method and apparatus to manufacture the improved tappet.

These and other objects and advantages of the invention will become obvious from the following detailed description.

SUMMARY OF THE INVENTION

The novel improved tappet of the invention for a valve drive of an internal combustion engine, which tappet (1) is guided for axial displacement in a reception bore of a cylinder head by a skirt (3) and is closed by a bottom (4) at a cam-proximate end, the skirt (3) comprising a first bush-like section (6) and a second bush-like section (7) of approximately equal diameter separated from each other preferably in a region of a central transverse plane, the first section (6) being connected to the bottom (4), while the second section (7) proceeds longitudinally from the first section (6), is characterized in that the hardened first bush-like section (6) is connected to the unhardened second bush-like section (7) by interlocking.

The invention achieves these objects by the fact that the first hardened bush-like section is connected to the second unhardened bush-like section by interlocking. Thus, in a simple way, a tappet is obtained which, on the one hand, possesses the required strength in the cam-contacting region and on the other hand, is free of embrittlement and cracking in the thin-walled regions. Joining of the two sections by interlocking simplifies the manufacture of the tappet because fewer manufacturing steps resulting in lower costs are involved.

In an advantageous embodiment of the invention, a hollow cylindrical extension of the second section oriented toward the bottom is surrounded at least by the end of the first section. According to another provision of the invention, this is achieved by the fact that the hollow cylindrical extension comprises a diameter enlargement which is engaged by the end of the first section.

According to a further development of the invention, the entire circumference of the hollow cylindrical extension or only a part thereof may be engaged by the end of the first section. In the case of engagement over the entire circumference of the hollow cylindrical extension, it is advantageous to use uniformly spaced locking elements whereby grooves are formed between every two of the locking elements and spread over the entire circumference, these grooves assume the function of oil supply channels. These grooves are made either by a diminution of the material of the bush-like section or of the hollow cylindrical extension or by an appropriate choice of the outer diameter of the hollow cylindrical extension with regard to the inner diameter of the bush-like section.

Interlocking between the two sections can also be achieved in that radially outward pointing resilient tongues in the region of the hollow cylindrical extension engage into a recess of the first bush-like section.

A method of making a tappet of the invention comprises pushing the first bush-like section including the bottom up to a stop in a holding matrix, plugging the second bush-like section onto a centering and positioning die, introducing the hollow cylindrical extension into the first bush-like section and applying an axial force to make an elastomer ring expand radially outwards in the intended region of interlocking so that the hollow cylindrical extension is deformed plastically in the region of the central transverse plane into the first bush-like section.

The equipment for executing the method comprises a holding matrix having an axial stop and a centering and positioning die which is arranged for axial displacement in a pressure sleeve and can be pushed longitudinally into the matrix, there being an elastomer ring arranged between the centering and positioning die and the pressure sleeve. To preserve the axially extending oil supply channel, the invention provides that the elastomer ring has a recess in the region of the oil supply channel or that the centering and positioning die comprises a rib pointing in axial direction and engaging into a recess of complementary shape in the pressure sleeve.

DETAILED DESCRIPTION OF THE DRAWINGS.

Figure 1:
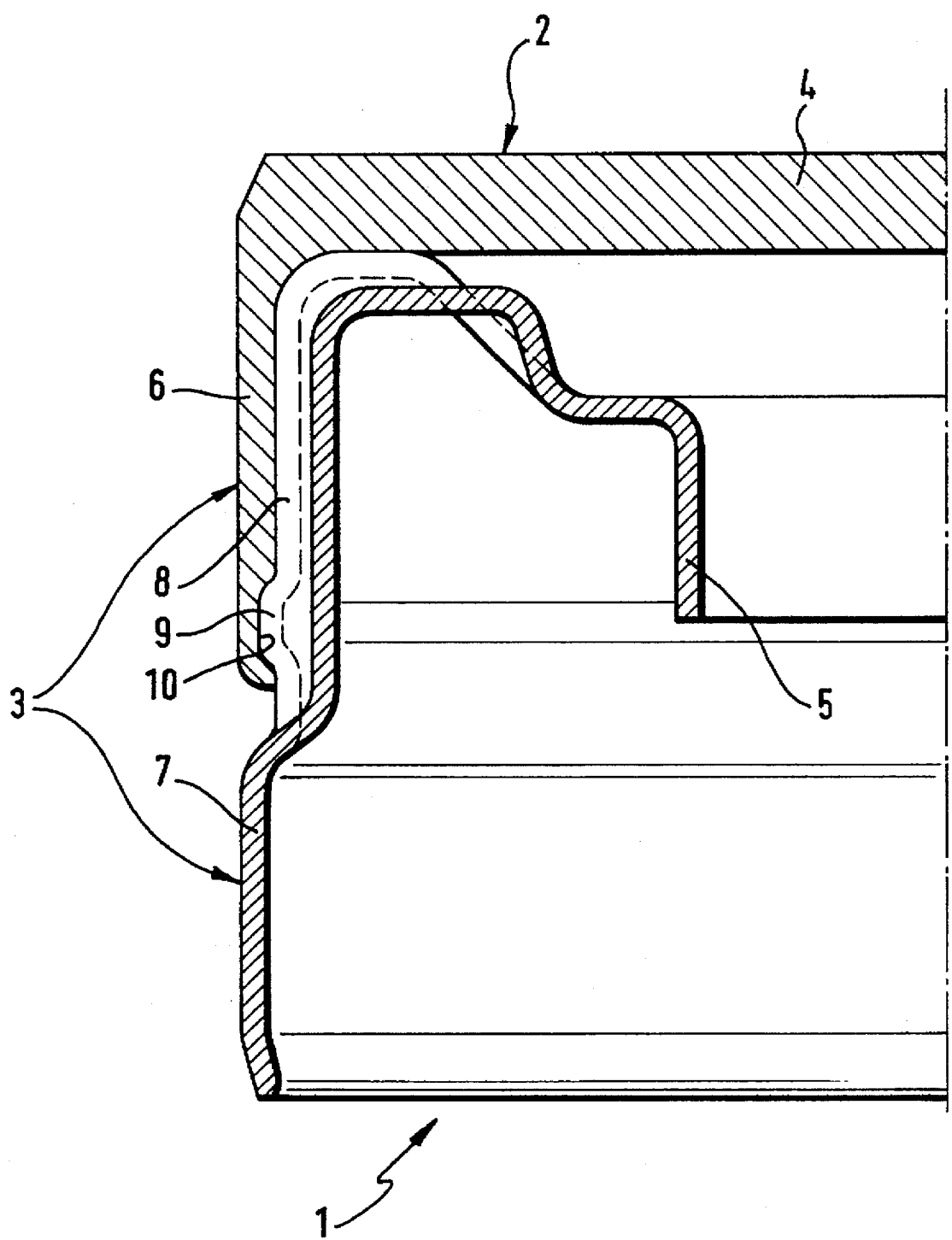
FIGS. 1, 3 are longitudinal cross-sections through different 4 & 5 embodiments of a tappet of the invention.

FIG. 1 shows a cup-shaped valve tappet 1 comprising a hollow cylindrical housing 2 which is arranged with its skirt 3 for axial displacement in a reception bore of a cylinder head, not shown. One end of the tappet 1 is closed by a circular bottom 4 which is contacted by a cam, not shown. Arranged coaxially with the skirt within the tappet in the guide sleeve 5, is a clearance compensation element, not shown either.

The skirt 3 of the housing 2 is divided into two along a central transverse plane so that it comprises a first and a second bush-like section 6,7. The first bush-like section 6 is closed at its cam-proximate end by the bottom,4. The second bush-like section 7 extends axially in cam-distal direction from the first bush-like section 6. The second bush-like section 7 comprises a hollow cylindrical extension 8 extending towards the cam and bearing sealingly against the inner peripheral surface of the first bush-like section except in the region of one or more oil supply channels.

According to the invention, the hollow cylindrical extension 8 comprises at its cam-distal end, a diameter enlargement 9 which is engaged by the end of the first bush-like section 6. Here again, the diameter enlargement 9 of the hollow cylindrical extension 8 bears sealingly against the inner peripheral surface of the first bush-like section 6 except in the region of one or more axially extending oil supply channels. To achieve this, the first bush-like section 6, which is closed at one end by the bottom 4, is provided at its lower end with a material diminution in the form of a peripheral groove 10 into which, after a hardening procedure, the soft diameter enlargement 9 is plastically deformed. Due to the thus formed border undercut of the hardened bush-like section 6, the soft hollow cylindrical extension 8, and the parts 5 and 7 connected thereto, are pressed with pre-tension against the bottom 4 so that an inseparable, interlocked unit is formed.

Figure 2:
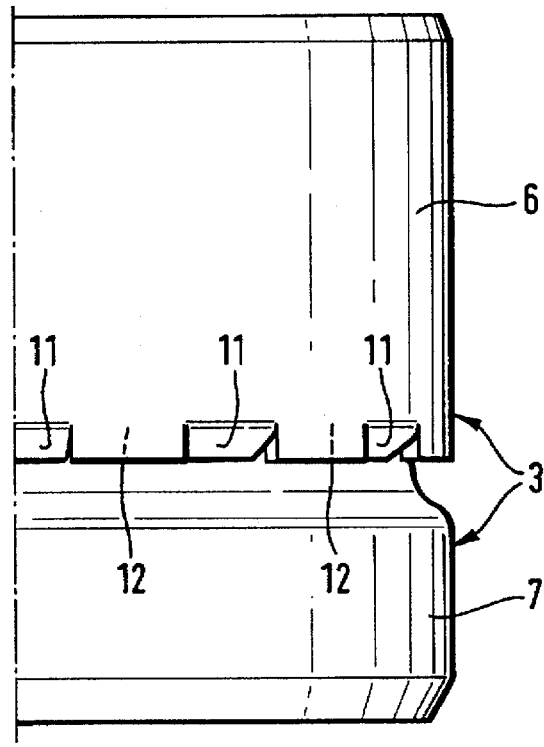
FIG. 2 is a side view of a tappet of the invention.
Figure 3:
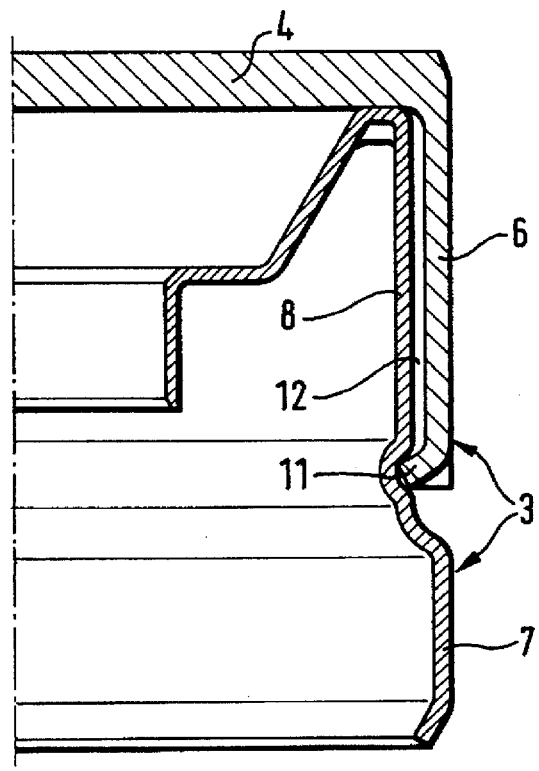

The tappet 1 shown in FIGS. 2 and 3 is different from FIG. 1 in that the hollow cylindrical extension 8 is engaged by uniformly spaced locking elements 11 which are formed by axial incisions, not referenced, made in the first bush-like section 6. These locking elements 11 are bent towards the hollow cylindrical extension 8 by the application of a radial force and penetrate into the material of the extension 8 so that an interlocked Unit is created. In this way, between every two locking elements 11, a defined number of oil supply or dearation channels 12 are formed in peripheral direction whose radial dimension is determined by the difference between the outer diameter of the hollow cylindrical extension 8 and the inner diameter of the bush-like section 6. Thus, an optimum supply of the tappet with oil is guaranteed in every position of installation.

Figure 4:
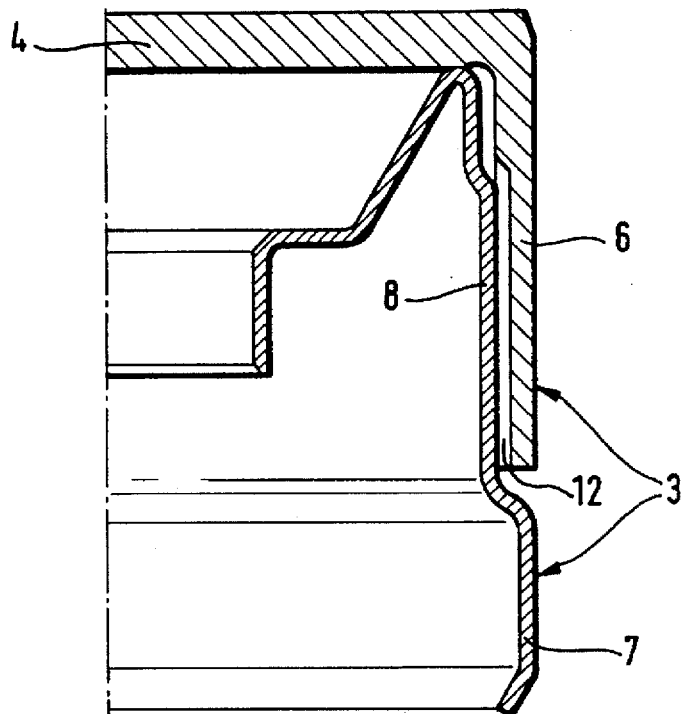

In contrast to FIG. 3, the radial dimension of the oil supply canal 12 of FIG. 4 is not determined by the difference between the aforesaid diameters but by a material diminution in the bush-like section 6. This has the advantage that the centering of the hollow cylindrical extension 8 in the bush-like section 6 does not have to be effected by the locking elements 11 alone but by the contacting of the inner peripheral surface of the bush-like section 6 by the outer peripheral surface of the hollow cylindrical extension 8.

Figure 5:
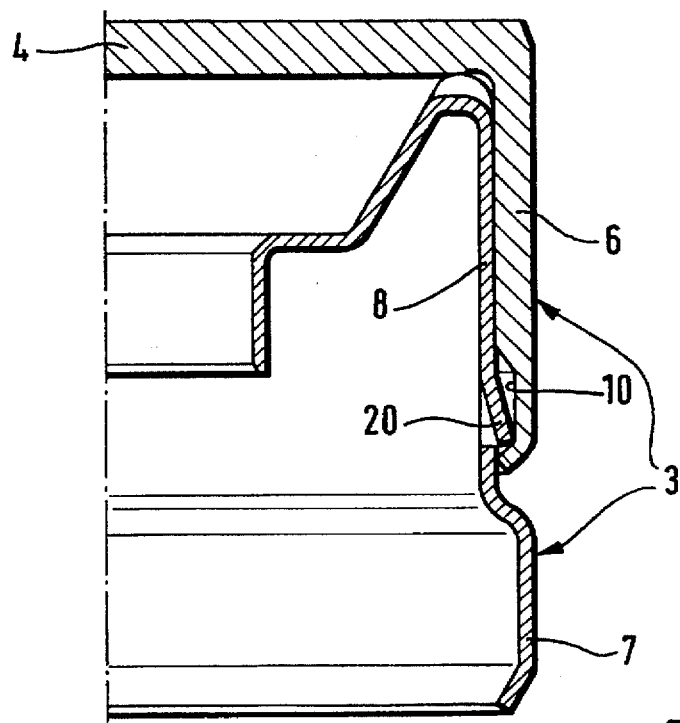

In the embodiment of FIG. 5, the interlocked connection between the first bush-like section 6 and the second bush-like section 7 is assured by radially outward oriented resilient tongues 20 arranged on the lower end of the extension 8 which engage into the peripheral groove 10 of the first bush-like section 6.

Figure 6:
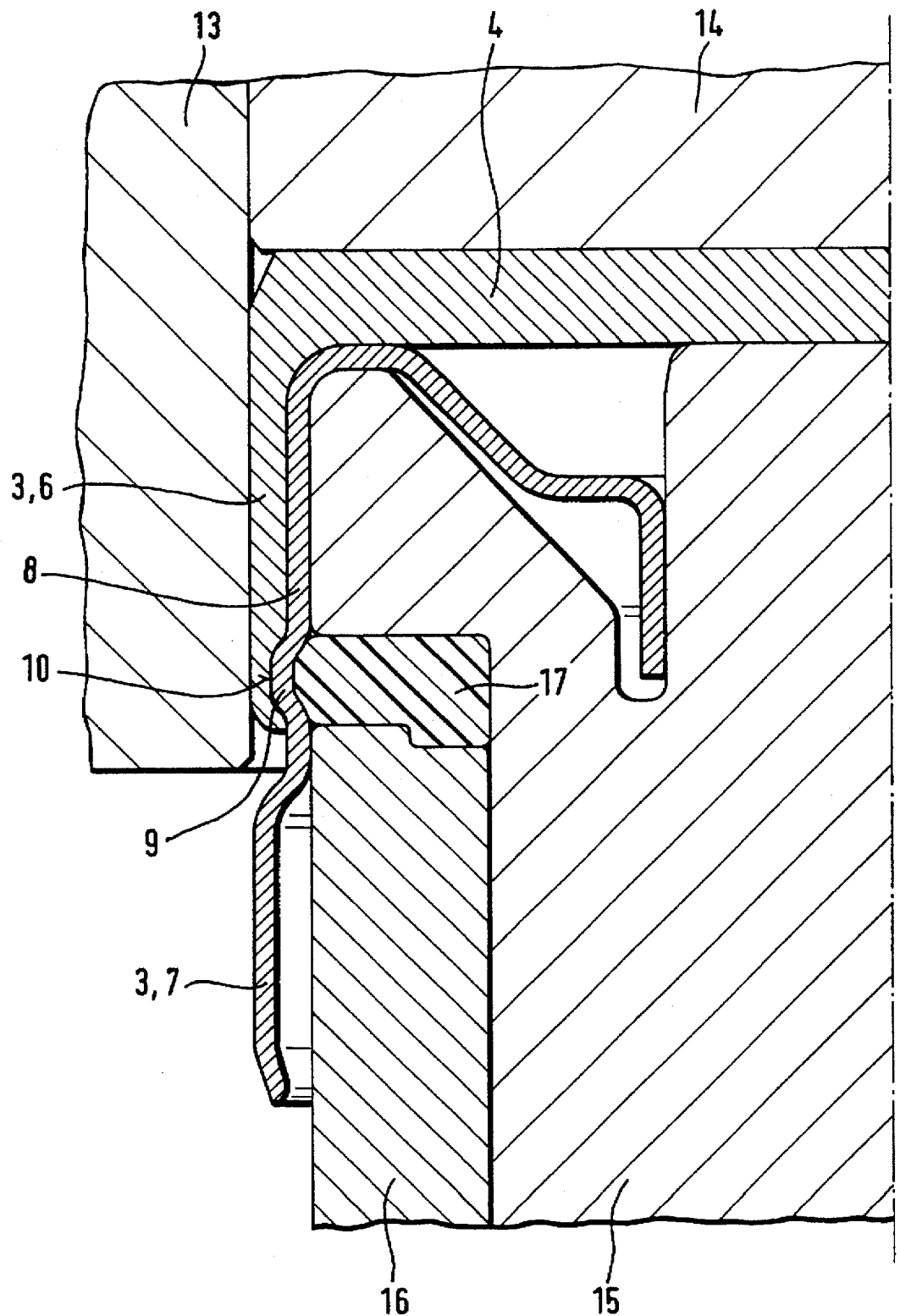
FIG. 6 is a longitudinal cross-section through a holding matrix with a die arranged therein.

The apparatus for making the tappet of the invention shown in FIG. 6 comprises a holding matrix 13 which is provided at an open end with an axial stop 14. A centering and positioning die 15 which carries on its top the elements 6, 7 to be interlocked, is introduced into this holding matrix 13. The centering and positioning die 15 is arranged for axial displacement in a pressure sleeve 16. By the application of a force acting in the axial direction, an elastomer ring 17 arranged between the pressure sleeve 16 and the centering and positioning die 15 is expanded in radial direction so that, in the region of the elastomer ring 17, the hollow cylindrical extension 8 is endowed with a diameter enlargement 9 which deforms plastically into the peripheral groove 10 of the bush-like section 6 obtained by a material diminution.

Figure 7:
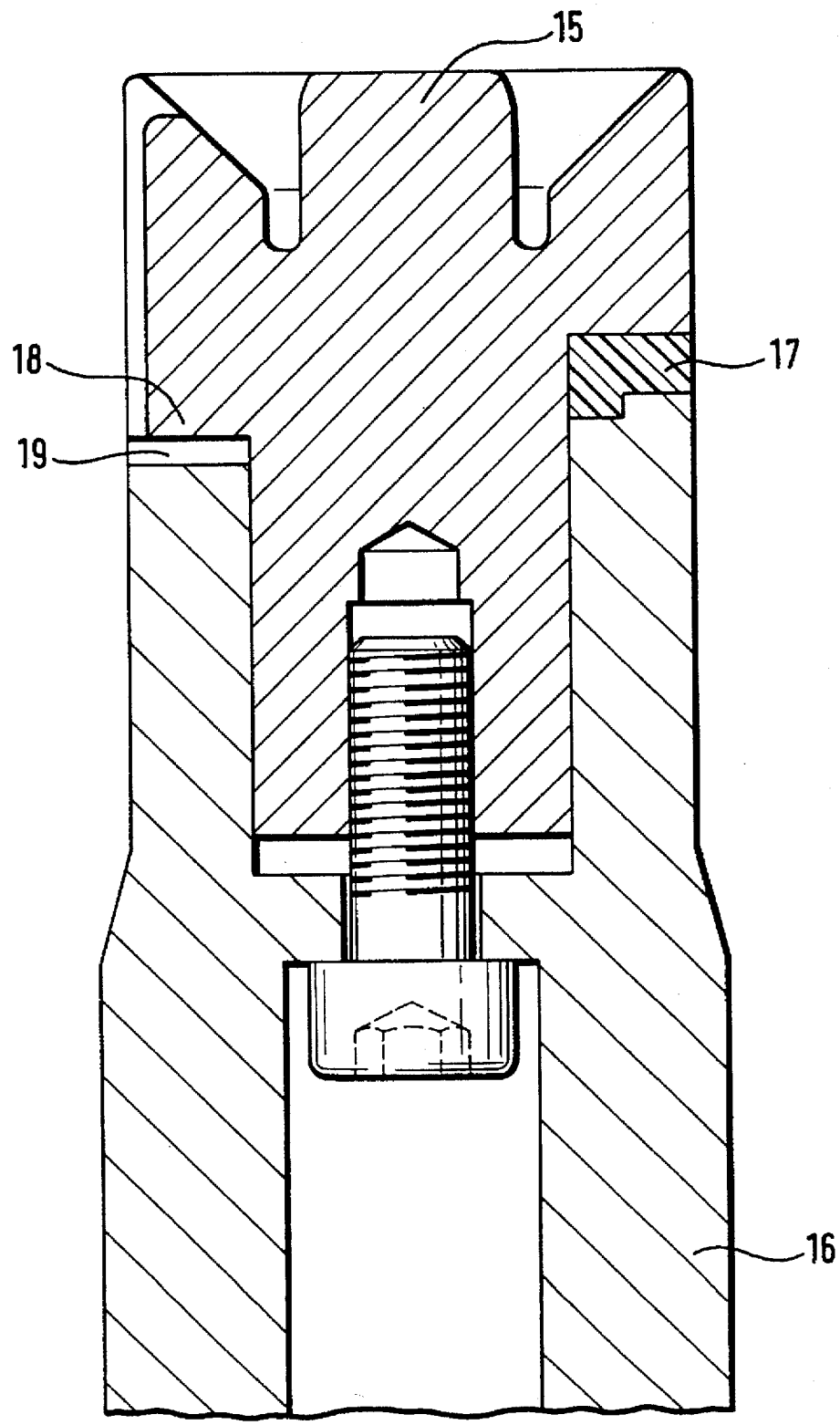
FIG. 7 is a longitudinal cross-section through a die.

As is evident to a person skilled in the art from FIG. 7, to prevent a blocking of the oil supply channel 12 by the joining of the two bush-like sections 6 and 7 to each other, a recess must be provided in the elastomer ring 17 in the region of the oil supply channel 12. In the region of this recess, the centering and positioning die 15 comprises an axially oriented lengthened rib 18 which engages into a recess 19 of complementary shape in the pressure sleeve 16 when an axial force is applied to the pressure sleeve 16.

Various modifications of the invention may be made without departing from the spirit or scope thereof and it is to be understood that the invention is intended to be limited only as defined in the appended claims.

What we claim is:

1. A tappet (1) for a valve drive of an internal combustion engine, said tappet (1) is guided for axial displacement in a reception bore of a cylinder head by a skirt (3) and is closed by a bottom (4) at a cam-proximate end, the skirt (3), comprising a first hardened bush-like section (6) and a second unhardened bush-like section (7) of approximately equal diameter separated from each other in a region of a central transverse plane of the tappet, the first section (6) being connected to the bottom (4), while the second section (7) proceeds longitudinally from the first section (6), characterized in that the hardened first bush-like section (6) is connected to the unhardened second bush-like section (7) by interlocking.

2. A tappet (1) of claim 1 wherein a hollow cylindrical extension (8) of the second section (7) oriented towards the bottom (4) is surrounded at least by an end of the first section (6).

3. A tappet (1) of claim 2 wherein the hollow cylindrical extension (8) comprises a diameter enlargement (9) which is engaged by the end of the first section (6).

4. A tappet (1) of claim 2 wherein at least a part of a circumference of the hollow cylindrical extension (8) is engaged by the end of the first section (6).

5. A tappet (1) of claim 4 wherein the hollow cylindrical extension (8) is engaged by uniformly spaced locking elements (11).

6. A tappet (1) of claim 5 wherein grooves (12) extending between the first bush-like section (6) and the hollow cylindrical extension (8) are formed by a diminution of material of at least one of the first bush-like section (6) and the hollow cylindrical extension (8).

7. A tappet (1) of claim 5 wherein grooves (12) extending between the first bush-like section (6) and the hollow cylindrical extension (8) are obtained by an appropriate choice of an outer diameter of the hollow cylindrical extension (8) with regard to an inner diameter of the first bush-like section (6).

8. A tappet (1) of claim 2 wherein radially outward pointing resilient tongues (20) in a region of the hollow cylindrical extension (8) engage into a peripheral groove (10) of the first bush-like section (6).

* * * * *